US010021148B2

(12) United States Patent
Johnson et al.

(10) Patent No.: US 10,021,148 B2
(45) Date of Patent: *Jul. 10, 2018

(54) SELECTIVE COPYING OF TRACK DATA THROUGH PEER-TO-PEER REMOTE COPY

(71) Applicant: International Business Machines Corporation, Armonk, NY (US)

(72) Inventors: Gavin S. Johnson, San Jose, CA (US); Michael J. Koester, Hollister, CA (US); Kevin L. Miner, Apopka, FL (US)

(73) Assignee: International Business Machines Corporation, Armonk, NY (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/158,477

(22) Filed: May 18, 2016

(65) Prior Publication Data
US 2016/0261650 A1 Sep. 8, 2016

Related U.S. Application Data

(63) Continuation of application No. 14/701,454, filed on Apr. 30, 2015, now Pat. No. 9,361,026, which is a
(Continued)

(51) Int. Cl.
G06F 3/06 (2006.01)
H04L 29/06 (2006.01)
(Continued)

(52) U.S. Cl.
CPC .......... H04L 65/1083 (2013.01); G06F 3/061 (2013.01); G06F 3/065 (2013.01);
(Continued)

(58) Field of Classification Search
CPC . H04L 65/1083; H04L 49/552; G06F 3/0683; G06F 3/0647; G06F 3/0608;
(Continued)

(56) References Cited

U.S. PATENT DOCUMENTS 418,088 A 12/1889 Thomas
8,281,093 B1 * 10/2012 Krishnan ............ G06F 11/1469
711/162
(Continued)

FOREIGN PATENT DOCUMENTS

JP 2001034568 A 2/2001
WO 2004094980 A2 11/2004

OTHER PUBLICATIONS

Tate et al., "Introduction to SAN Distance Solutions," IBM International Technical Support Organization, Jan. 2002, pp. 1-508.
(Continued)

Primary Examiner — Hong Kim
(74) Attorney, Agent, or Firm — Zilka-Kotab, P.C.

(57) ABSTRACT

In one embodiment, a computer-implemented method includes: receiving a request to establish a Peer-to-Peer Remote Copy (PPRC) relationship between a primary storage system and a secondary storage system; and copying one or more data tracks of a primary storage device in the primary storage system to the secondary storage system without copying at least one other data track of the primary storage device to the secondary storage system. The one or more data tracks of the primary storage device comprise one or more data tracks of a first characteristic. Other portions of the primary storage device comprise one or more other data tracks of a second characteristic. Tracks of the first characteristic may include valid data records, while tracks of the second characteristic may include invalid data records and/or empty tracks. Corresponding systems and computer program products are also disclosed.

18 Claims, 4 Drawing Sheets

Related U.S. Application Data continuation of application No. 13/764,664, filed on Feb. 11, 2013, now Pat. No. 9,032,172.

(51) Int. Cl.
*H04L 12/939* (2013.01)
*G06F 13/00* (2006.01)

(52) U.S. Cl.
CPC ............ *G06F 3/067* (2013.01); *G06F 3/0608* (2013.01); *G06F 3/0647* (2013.01); *G06F 3/0655* (2013.01); *G06F 3/0683* (2013.01); *H04L 49/552* (2013.01); *G06F 3/06* (2013.01)

(58) Field of Classification Search
CPC .......... G06F 3/067; G06F 3/065; G06F 3/061; G06F 3/0655; G06F 3/06
USPC ......................... 711/161, 162, 111; 714/4.11
See application file for complete search history.

(56) References Cited

U.S. PATENT DOCUMENTS

| | | | |
|---|---|---|---|
| 9,032,172 B2 | 5/2015 | Johnson et al. | |
| 9,361,026 B2 | 6/2016 | Johnson et al. | |
| 2002/0133511 A1* | 9/2002 | Hostetter | G06F 11/2082 |
| 2002/0133512 A1 | 9/2002 | Milillo et al. | |
| 2003/0017322 A1 | 1/2003 | Kim | |
| 2003/0158869 A1 | 8/2003 | Micka | |
| 2003/0177322 A1 | 9/2003 | Crockett et al. | |
| 2004/0181641 A1 | 9/2004 | Nguyen et al. | |
| 2005/0081091 A1* | 4/2005 | Bartfai | G06F 11/2058 |
| | | | 714/6.31 |
| 2005/0193230 A1* | 9/2005 | Springer | G06F 11/1441 |
| | | | 714/5.11 |
| 2006/0179170 A1 | 8/2006 | Kodama | |
| 2007/0061531 A1 | 3/2007 | Bartfai et al. | |
| 2009/0070528 A1 | 3/2009 | Bartfai et al. | |
| 2009/0164742 A1* | 6/2009 | Wach | G06F 11/2084 |
| | | | 711/162 |
| 2009/0313503 A1 | 12/2009 | Atluri et al. | |
| 2010/0023647 A1 | 1/2010 | Betz et al. | |
| 2010/0049823 A1 | 2/2010 | Saigo et al. | |
| 2014/0229693 A1 | 8/2014 | Johnson et al. | |
| 2015/0234600 A1 | 8/2015 | Johnson et al. | |

OTHER PUBLICATIONS

Rogers et al., "ABCs of z/OS System Programming vol. 3," IBM International Technical Support Organization, Mar. 2010, pp. 1-524.
US-RD 418088 A, "Peer to Peer Remote Copy for Computer Competitive Iceberg Subsystems Has Snapshot Copy Capability Which Detects When a Volume Is Defined to a PPRC Pair and When The Second Device Is Within The Same Subsystem," International Business Machines Corporation, Jan. 20, 1999, 1 page.
Non-Final Office Action from U.S. Appl. No. 13/764,664, dated Sep. 3, 2014.
Notice of Allowance from U.S. Appl. No. 13/764,664, dated Jan. 7, 2015.
Johnson et al., U.S. Appl. No. 13/764,664, filed Feb. 11, 2013.
Johnson et al., U.S. Appl. No. 14/701,454, filed Apr. 30, 2015.
Non-Final Office Action from U.S. Appl. No. 14/701,454, dated Jul. 10, 2015.
Final Office Action from U.S. Appl. No. 14/701,454, dated Dec. 17, 2015.
Notice of Allowance from U.S. Appl. No. 14/701,454, dated Mar. 14, 2016.

* cited by examiner

SELECTIVE COPYING OF TRACK DATA THROUGH PEER-TO-PEER REMOTE COPY

BACKGROUND

The present invention relates to data storage, and more particularly, to migrating data from one volume to a new target volume by via Peer-to-Peer Remote Copy (PRRC).

In conventional data storage systems, PPRC is a common protocol used to replicate a volume, such as a direct-access storage device (DASD), from one control unit (primary control unit) to a secondary control unit. According to present PPRC protocol, establishing a PPRC pair to replicate a volume from a primary control unit to a secondary control unit volume requires copying every single track on the primary control unit volume, regardless of whether each track contains data or not. This approach undesirably introduces unnecessary overhead in the PPRC pair establishment process by copying tracks that contain no data.

Therefore, a storage solution which improves the migration of data from one control unit to another control unit by reducing overhead in the PPRC pair establishment process would be beneficial.

SUMMARY

In one embodiment, a primary storage system includes: at least one primary storage device; at least one controller; an interface for a hardwire connection that is adapted to communicate data between the primary storage system and a secondary storage system; and logic integrated with and/or executable by the at least one controller. The logic is configured to: receive a request to establish a Peer-to-Peer Remote Copy (PPRC) relationship between the primary storage system and the secondary storage system; set a path between the primary storage system and the secondary storage system via the hardwire connection in response to receiving the request; receive a memory map; establish the PPRC relationship between the primary storage system and the secondary storage system in response to receiving the memory map; and copy, based at least in part on the memory map, one or more data tracks of the primary storage device to the secondary storage system without copying at least one other data track of the primary storage device to the secondary storage system. The one or more data tracks of the primary storage device include data tracks of a first characteristic, and each other portion of the primary storage device comprises one or more data tracks of a second characteristic, where the data tracks of the first characteristic comprise valid data records, and the data tracks of the second characteristic comprise empty data tracks.

In another embodiment, a computer program product includes a computer readable storage medium having program code embodied therewith. The program code is readable/executable by a processor to cause the processor to: process, by the processor, a received request in response to receiving the request; and copy, by the processor, one or more data tracks of a primary storage device of the primary storage system to a secondary storage system without copying at least one other data track of the primary storage device to the secondary storage system, where the one or more data tracks of the primary storage device comprise data tracks of a first characteristic, and other portions of the primary storage device comprise one or more other data tracks of a second characteristic.

In yet another embodiment, a computer-implemented method includes: receiving a request to establish a Peer-to-Peer Remote Copy (PPRC) relationship between a primary storage system and a secondary storage system; and copying one or more data tracks of a primary storage device in the primary storage system to the secondary storage system without copying at least one other data track of the primary storage device to the secondary storage system, where the one or more data tracks of the primary storage device comprise data tracks of a first characteristic, and other portions of the primary storage device comprise one or more other data tracks of a second characteristic.

Other aspects and embodiments of the present invention will become apparent from the following detailed description, which, when taken in conjunction with the drawings, illustrate by way of example the principles of the invention.

DETAILED DESCRIPTION

Figure 1:
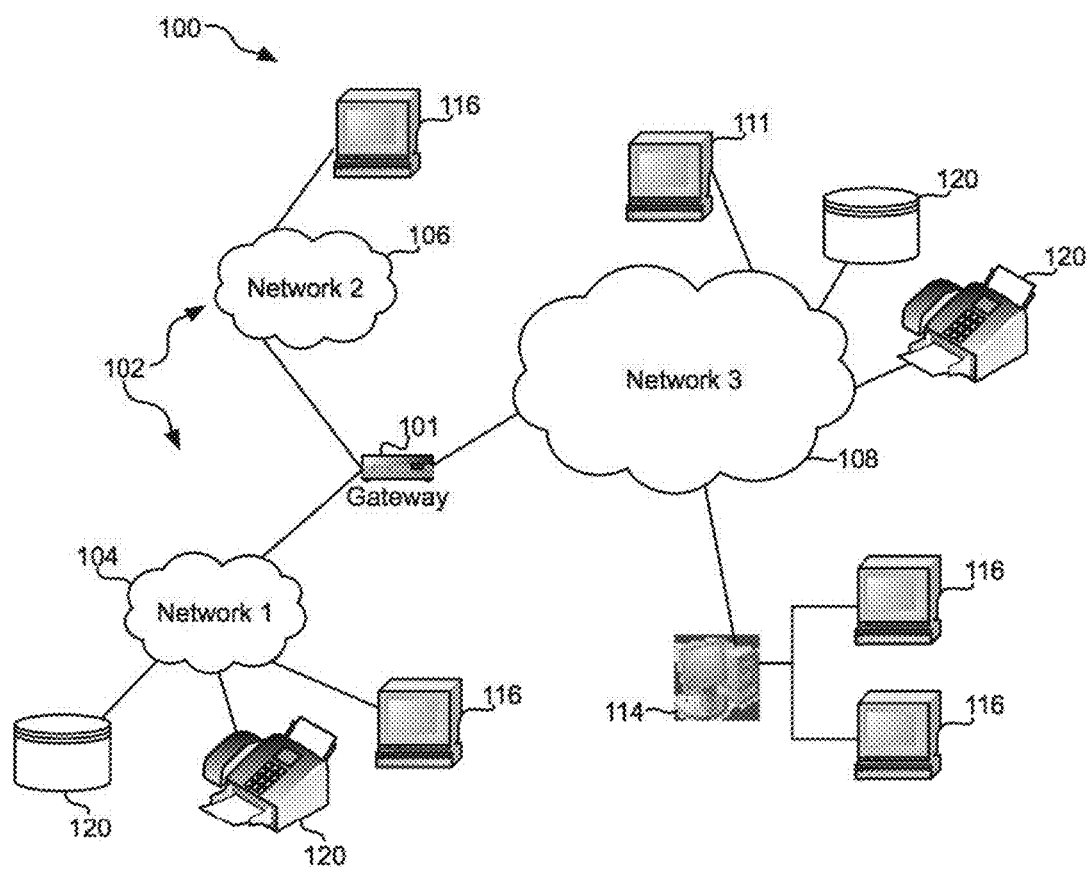
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

Disclosed herein are storage solutions which improve the migration of data from one storage system to another storage system by reducing overhead in a PPRC pair establishment process by transferring only data tracks comprising valid data record(s).

In one general embodiment, a primary storage system includes: at least one primary storage device; at least one controller; an interface for a hardwire connection that is adapted to communicate data between the primary storage system and a secondary storage system; and logic integrated with and/or executable by the at least one controller, the logic being adapted to: receive a request to establish a Peer-to-Peer Remote Copy (PPRC) relationship between the primary storage system and the secondary storage system; set the path between the primary storage system and the secondary storage system via the hardwire connection in response to receiving the request; receive a memory map; establish the PPRC relationship between the primary storage system and the secondary storage system in response to receiving the memory map; and copy, based at least in part on the memory map, one or more data tracks of the primary storage device to the secondary storage system without copying at least one other data track of the primary storage device to the secondary storage system.

In another general embodiment, a computer program product includes: a computer readable storage medium having program code embodied therewith, the program code readable/executable by a processor to: process a received request in response to receiving the request; process a received memory map; establish a Peer-to-Peer Remote Copy (PPRC) relationship between a primary storage system and a secondary storage system in response to processing the received memory map; and copy, based at least in part on the processed memory map, one or more data tracks of a primary storage device of the primary storage system to the secondary storage system without copying at least one other data track of the primary storage device to the secondary storage system.

In yet another general embodiment, a method includes: receiving a request to establish a Peer-to-Peer Remote Copy (PPRC) relationship between a primary storage system and a secondary storage system; setting a path between the primary storage system and the secondary storage system via a hardwire connection in response to receiving the request; receiving a memory map; establishing the PPRC relationship via the hardwire connection using the path; and copying, based at least in part on the memory map, one or more data tracks of a primary storage device in the primary storage system to the secondary storage system without copying at least one other data track of the primary storage device to the secondary storage system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

According to various embodiments, any copy services management tool may be used in conjunction with the migration methods described herein. In one exemplary embodiment, IBM's Tivoli Storage Productivity Center for Replication may be used.

Figure 2A:
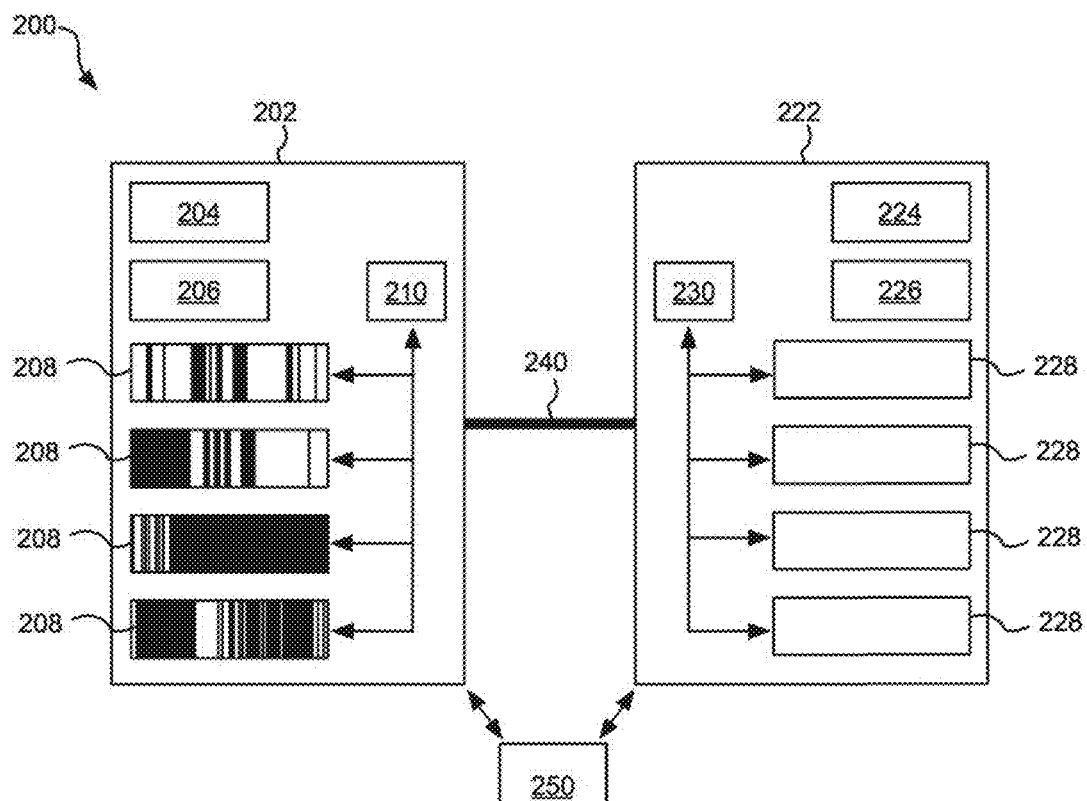
FIG. 2A schematically illustrates an exemplary system architecture for establishing a PPRC relationship, according to one embodiment.

FIG. 2A illustrates exemplary system architecture 200 for establishing a PPRC relationship, according to one embodiment. Those having ordinary skill in the art will appreciate that the system architecture 200 is but one of many possible architectures for establishing one or more PPRC relationships, and is presented merely by way of a simplified example to illustrate the principles of the presently disclosed inventive systems, methods and computer program products, in various embodiments.

As shown in FIG. 2A, the system architecture 200 includes a primary storage system 202 and a secondary storage system 222 in communication with each other via a hardwire connection 240, in one embodiment. The hardwire connection may be any type of hardwire physical connection, and may utilize any type of suitable cable and/or communication protocol, such as a fibre-channel connection (FICON), a T3 connection, a T12 connection, etc. as would be understood by one having ordinary skill in the art upon reading the present descriptions. Each system 202, 222 may include an interface for the hardwire connection 240, such as a port, bus, etc. compatible with the cable, fiber, or other communication mechanism of the hardwire connection 240.

The system architecture 200 may further include a host system 250 in communication with the primary storage system 202, in some embodiments. Advantageously, the host system 250 may in communication with one or more of the storage systems 202, 222 in the system architecture 200, and preferably is adapted to communicate instructions, commands, and/or data to at least the primary storage system 202. In particularly preferred embodiments, the host system 250 is adapted to transmit to the primary storage system 202 a request to establish a PRRC relationship between the primary storage system 202 and at least one other storage system such as secondary storage system 222. Moreover, the host system 250 may be adapted to transmit a bitmap to the primary storage system 202, in more embodiments.

With continuing reference to FIG. 2A, each storage system 202, 222 may include a plurality of components such as at least one processor 204, 224, at least one system controller 206, 226 which itself may include a processor, and a plurality of storage media 208, 228, each storage medium optionally being coupled to one or more subsystem controllers 210, 230, such as one or more memory subsystem controllers, in various embodiments.

The processors 204, 224 may be any suitable type, and are preferably adapted for processing one or more of instructions, commands, and/or data to facilitate the operation of the storage system architecture 200, in one embodiment. For example, the processor may be configured and/or adapted to process data, instructions and/or commands received from a host system 250, a system controller 206, 226, a subsystem controller 210, 230, and/or a storage medium 208, 228, in various approaches. In more embodiments, the processors 204, 224 may be of any type known in the art, such as a central processing unit (CPU), a field programmable gate array (FPGA), an application specific integrated circuit (ASIC), etc. The logic which is described below may be implemented in hardware or software, or a combination of hardware and software, as would be known to one of skill in the art.

The system controllers 206, 226 may be adapted to facilitate each storage system 202, 222 operating within the storage system architecture 200, and for example may facilitate communication of instructions, commands and/or data between the processor 204, 224 and one or more of the storage media 208, 228 and/or the subsystem controller 210, 230 in multiple embodiments.

The subsystem controllers 210, 230 may be adapted to facilitate communication and/or execution of instructions, commands, and/or data between the various storage media 208, 228 of the storage system architecture 200, as well as communication and/or execution of instructions, commands, and/or data between the various storage media 208, 228 of the storage system 202, 222 and various other components of the respective storage system 202, 222 (e.g. the processor 204, 224, system controller 206, 226, etc. as would be understood by one having ordinary skill in the art upon reading the present descriptions.

Figure 2B:
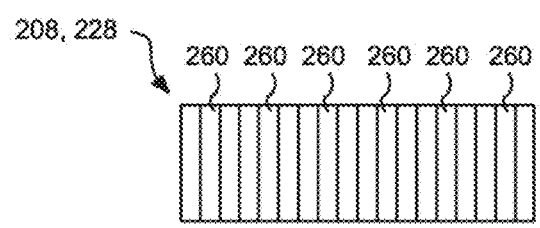
FIG. 2B is a schematic of a storage medium comprising a plurality of data tracks, according to one embodiment.

As shown in FIG. 2B, each storage medium 208, 228 may be characterized by a plurality of data tracks 260, each data track being adapted for storing data in one or more locations (e.g. memory addresses) associated therewith. As shown in FIG. 2B, the data tracks 260 are represented by sections of the storage medium, but may also correspond to locations of a logical or physical storage volume, in many embodiments. Storage media 208, 228 may have stored thereon data records, and the data records may be stored in one or more of a plurality of data tracks 260 of the respective storage media.

Storage media 208, 228 may be any suitable type of storage medium known in the art, such as random access storage media, sequential access storage media, magnetic disk media, magnetic tape media, solid-state media, etc. as would be understood by one having ordinary skill in the art upon reading the present descriptions.

Referring again to FIG. 2A, data tracks having one or more data records stored therein are represented by dark regions of each respective storage medium 208 of the primary storage system 202, while data tracks having no data records stored therein, or alternatively having invalid data records stored therein are represented by white regions of each respective storage medium 208 of the primary storage system 202.

While the foregoing descriptions of an exemplary system architecture 200 have been provided with reference to two separate storage systems 202, 204, one having ordinary skill in the art will appreciate that the principles set forth herein are equally applicable to other system architectures having more or less than two storage systems. For example, the PPRC pairing and data copying implementations of the present disclosure are also applicable to a system architecture comprising a single storage system and a plurality of storage devices (e.g. logical and/or physical volumes, storage media, etc.) and instead of establishing a PPRC relationship between two storage systems, it may be advantageous to establish a PPRC relationship between some or all of the various storage devices and copy data from one device to a second device. Preferably, each set of storage devices for which a PPRC relationship is to be established and data is to be copied are coupled by a physical data connection (e.g. a hardwire connection 240 as discussed above and shown in FIG. 2A).

Figure 3:
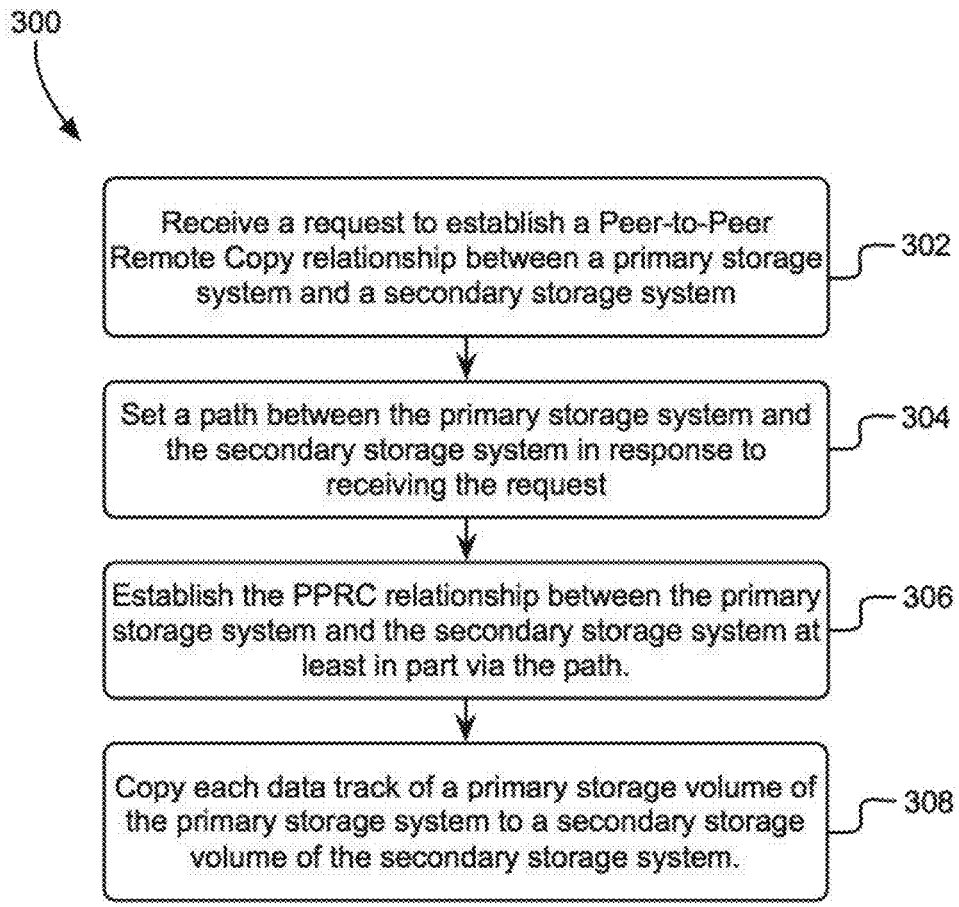
FIG. 3 is a flowchart of a method for establishing a PPRC relationship between a primary storage system and a secondary storage system and copying data from the primary storage system to the secondary storage system, according to the prior art.

A conventional method for establishing a PPRC relationship and copying data from a primary storage system to a secondary storage system is shown in FIG. 3, according to the prior art.

In operation 302, a request to establish a PPRC relationship between a primary storage system and a secondary storage system is received.

In operation 304, a path is set between the primary storage system and the secondary storage system in response to receiving the request.

In operation 306, the PPRC relationship is established between the primary storage system and the secondary storage system at least in part via the path.

In operation 308, each and every data track of a primary storage volume of the primary storage system is copied to a secondary storage volume of the secondary storage system.

Notably, in conventional methods, operation 308 copies each and every data track of the primary storage volume to the secondary storage volume, without regard to whether the data track contains any data record(s) and further without regard to whether any data records stored on a data track are "valid," i.e. in use, as may be indicated by the existence of a valid pointer associating the data record with the location in which it is stored on the primary storage volume; as may be indicated by data record(s) stored on the data track being readable; as may be indicated by data record(s) stored on the data track not being "corrupt;" or as may be indicated by any other equivalent measure or method known to those having ordinary skill in the art and which would be realized upon reading the present descriptions.

However, as further understood by those having ordinary skill in the art, storage media such as media 208, 228 of FIG. 2A are rarely entirely full, i.e. it is unlikely that any given storage volume, medium, device, etc. will ever have data record(s) stored in each and every data track, or have valid data records stored in every data track, in various embodiments. Moreover, a skilled artisan reading the present descriptions will also appreciate that the conventional methods for establishing PPRC relationship(s) and copying data from one storage system or device to another copy every single data track of the primary (source) storage device to the secondary (target) storage device. Therefore, the conventional methods (such as method 300 shown in FIG. 3 and described above) introduce overhead in the PPRC relationship establishment and data copy processes. Particularly, the conventional methods introduce overhead in an amount proportional to the number of data tracks in the primary (source) storage device.

In contrast, various embodiments of the presently disclosed inventive systems, methods and computer program products introduce mechanisms, logic and/or methodologies to establish a PPRC relationship and copy data while introducing less overhead than corresponding conventional methods (such as method 300). In particular, the presently disclosed embodiments introduce an amount of overhead proportional to the number of data tracks in the primary storage device having valid data records stored therein. Thus, if a storage device is characterized by having approximately 50% of its data tracks occupied by valid data records, the presently disclosed methods of establishing a PPRC relationship and copying data to a secondary (target) storage device would introduce about half as much overhead, and therefore be accomplished in about half as much time as establishing the same PPRC relationship and copying the same data using conventional methods.

Figure 4:
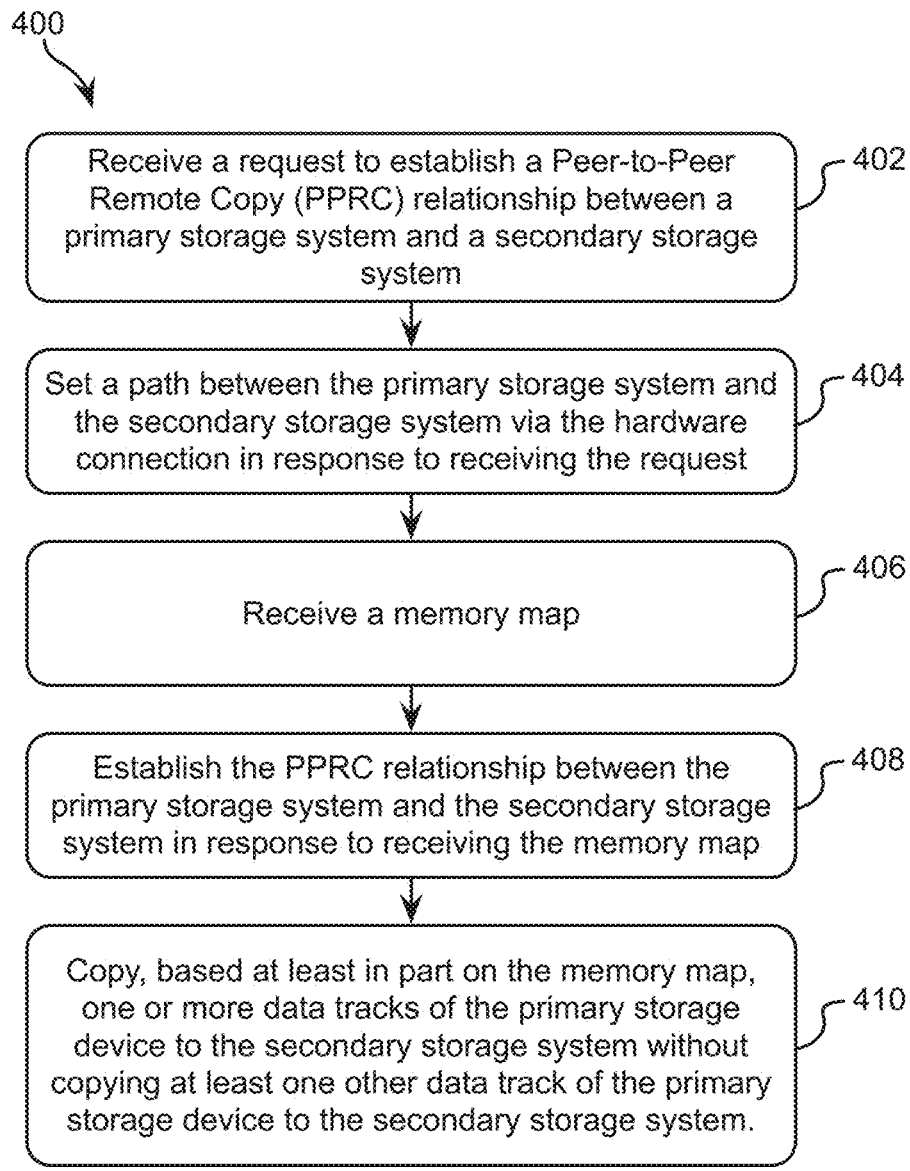
FIG. 4 is a flowchart of a method for establishing a PPRC relationship between a primary storage system and a secondary storage system and copying data from the primary storage system to the secondary storage system, according to one embodiment.

In accordance with one inventive embodiment commensurate in scope with the present descriptions, as shown in FIG. 4, a method 400 is shown. The method 400 may be carried out in any desired environment, and may include embodiments and/or approaches described in relation to FIGS. 1-2B, among others. Of course, more or less operations than those shown in FIG. 4 may be performed in method 400 as would be known to one of skill in the art.

In one embodiment, method 400 includes operation 402, where a request to establish a PPRC relationship between a primary storage system and a secondary storage system is received.

In operation 404, a path is set between the primary storage system and the secondary storage system via a hardwire connection in response to receiving the request.

In operation 406, a memory map is received.

The memory map may be any type of map, page file, allocation table, etc. suitable for storing information regarding the location and validity of data tracks on a storage medium. For example, in one embodiment the memory map may be a bitmap, and preferably contains information designating which data tracks of a primary storage device in the primary storage system contain "valid" data records, and based on this information the primary storage system may selectively copy valid data records from the primary storage device to the secondary storage system in the course of the PPRC relationship.

For example, the bitmap may be generated by software, and may be generated based at least in part on a track bit map (a bit map contained in/maintained by hardware mapping the allocation of space on a storage volume, i.e. mapping which data tracks contain valid data records). Further, the bitmap and/or the track bit map may be generated based at least in part on a storage volume table of contents. In still more approaches, the bitmap may be an out-of-sync (OOS) bitmap, as discussed in further detail below with respect to point-in-time copy (PITC) principles applicable to the presently disclosed methods, systems, and computer program products. Of course, as would be understood by one having ordinary skill in the art upon reading the present descriptions, any suitable bitmap may be utilized, so long as the primary storage system is capable of determining which data tracks in a source storage device (e.g. a primary storage volume) contain valid data records and distinguishing those data tracks from other data tracks not containing valid data records (or not containing any data records whatsoever).

In operation 408, the PPRC relationship is established via the hardwire connection using the path (e.g. the path set in operation 404).

In operation 410, based at least in part on the bitmap, one or more data tracks of a primary storage device in the primary storage system are copied from the primary storage device to the secondary storage system without copying at least one other data track of the primary storage device to the secondary storage system.

In some more embodiments, all or any portion of method 400 may be implemented in a system and/or a computer program product.

For example, in one embodiment a system includes a primary storage system, comprising: at least one primary storage device, e.g. a storage medium, a volume of a storage medium; at least one controller, which may include a system controller, a subsystem controller, a memory controller, a controller of a host, etc. as would be understood by one having ordinary skill in the art upon reading the present descriptions.

Moreover, the system also includes a hardwire connection, e.g. a Fibre-channel connection (FICON), a T3 connection, a T12 connection, an Enterprise Systems Connection (ESCON), etc. as would be understood by one having ordinary skill in the art upon reading the present descriptions. Preferably, the hardwire connection should be adapted to communicate data between the primary storage system and a secondary storage system.

Further still, in one embodiment the system further includes logic integrated with and/or executable by the at least one controller. The logic is adapted to: receive a request, such as a command channel word (CCW) in one embodiment. Further, the request may be a request to establish a Peer-to-Peer Remote Copy (PPRC) relationship between the primary storage system and the secondary storage system; set the path between the primary storage system and the secondary storage system via the hardwire connection in response to receiving the request; receive a bitmap; establish the PPRC relationship between the primary storage system and the secondary storage system in response to receiving the bitmap; and copy, based at least in part on the bitmap, one or more data tracks of the primary storage device to the secondary storage system without copying at least one other data track of the primary storage device to the secondary storage system.

In various embodiments, storage media such as the primary storage device, secondary storage device, etc. may have or be one or more of a logical volume, a physical volume, a magnetic disk medium, a magnetic tape medium, an optical medium, a direct-access storage device (DASD), solid state memory, etc. as would be understood by one having ordinary skill in the art.

In some embodiments, the bitmap is generated by software for use by a controller (such as controllers 206, 226, memory subsystem controllers 210, 230 as shown in FIG. 2A, or alternatively a controller of host system 250 (not shown)). In further embodiments, the bitmap may be generated based at least in part on a track bit map, e.g. a volume table of contents on the primary device containing records indicating the tracks on the volume having valid data stored therein. In still further embodiments, the bitmap may be an out-of-sync (OOS) bitmap. The track bit map and OOS bitmaps will be discussed in further detail below.

Preferably, one advantageous characteristic of embodiments of the presently disclosed methods, systems and computer program products is that an amount of time required to copy the one or more data tracks of the primary storage device is directly proportional to a number of data tracks of the primary device to be copied to the secondary storage system. In other words, the amount of time required to copy the data tracks to the secondary storage system is proportional to the number of tracks copied as opposed to the total number of tracks on the primary storage device. The number of tracks copied may be expressed in any suitable manner, such as a number, as a percent allocation (or percent unallocated, i.e. percent free space) of the primary storage device, as an amount of data to be copied (e.g. bits, bytes, etc.), etc. as would be understood by one having ordinary skill in the art upon reading the present descriptions.

For example, if the primary storage device is characterized by having about 90% of available space allocated, then the amount of time required to copy the allocated space would be approximately 90% of the amount of time required to copy all the space (allocated and unallocated) of the primary storage device to the secondary storage system. Similarly, if the primary storage device is characterized by having about 50% or about 10% of available space allocated, then the amount of time required to copy the allocated space would be approximately 50% or 10%, respectively of the amount of time required to copy the all the space (allocated and unallocated) of the primary storage device to the secondary storage system.

Moreover, in one embodiment each of the one or more data tracks of the primary storage device copied to the secondary storage system comprise data tracks of a first characteristic, and each of the other data tracks of the primary storage device (i.e. those not copied to the secondary storage system) are data tracks of a second characteristic. In a preferred approach, the data tracks of the first characteristic comprise valid data records, i.e. data records accessible by the primary storage system, such as data records having at least one pointer associated therewith, and the data tracks of the second characteristic include only invalid data records, e.g., inaccessible/unusable data such as data records having no pointer associated therewith, corrupted data, previously deleted data records, etc.; and/or empty data tracks, i.e. tracks having no data records stored therein or associated therewith.

Thus, the amount of time required to copy the one or more data tracks of the primary storage device is directly proportional to the number of data tracks of the first characteristic, in one embodiment.

Of course, other measures of whether data records are valid or invalid may be employed without departing from the scope of the present disclosures. For example, a valid data record may be any data record desired for copying from a primary storage device to a secondary storage system, for any reason and as designated in any suitable manner as would be understood by one having ordinary skill in the art upon reading the present descriptions. Similarly, invalid data records may be any data record not desired for copying from a primary storage device to a secondary storage system, for any reason and as designated in any suitable manner as would be understood by one having ordinary skill in the art upon reading the present descriptions.

Similarly, in one embodiment a computer program product includes a computer readable storage medium having stored/encoded thereon: first program instructions executable by a processor to cause the processor to process a received request, e.g. a command to set a path between the primary storage system and a secondary storage system via a hardwire connection, in response to receiving the request; second program instructions executable by the processor to cause the processor to process a received bitmap; third program instructions executable by the processor to cause a primary storage system to establish a PPRC relationship between the primary storage system and a secondary storage system in response to processing the received bitmap; and fourth program instructions executable by the processor to cause the primary storage system to copy, based at least in part on the processed bitmap, one or more data tracks of a primary storage device to the secondary storage system without copying at least one other data track of the primary storage device to the secondary storage system.

Commensurate with the foregoing descriptions, the one or more data tracks of the primary storage device copied to the secondary storage system each preferably comprise one or more valid data records, while each of the at least one other data track(s) not copied to the secondary storage system do not contain any valid data records, and therefore may be omitted from any copy operation to eliminate overhead thereof.

In another instance, the second program instructions cause the processor to designate only the one or more data tracks of the primary storage device for copying. In this manner, only data tracks comprising valid data records are designated for copying to the secondary storage device, reducing the overhead and time needed to establish a PPRC relationship and/or copy data to the secondary storage system.

In more embodiments, computer program products within the scope of the present disclosures may additionally and/or alternatively include fifth program instructions executable by a processor of a host system to cause the processor of the host system to generate the bitmap using software, and/or fifth program instructions executable by a processor to cause the processor to receive the bitmap from a host system configured to generate the bitmap using a processor of the host system. Preferably, the bitmap is based at least in part on a track bit map.

Those having ordinary skill in the art will also appreciate that some embodiments of the presently disclosed systems, methods and/or computer program products may employ point-in-time copy (PITC) principles to the selective copying of tracks from one storage device to another.

Generally, a point-in-time copy (PITC) is used to create a backup within a single system, e.g., a group of datasets is copied to a different location, but possibly within the same storage controller.

In actuality, since a physical copy takes a tangible amount of time to perform, the backup is typically created with pointers, so that when a request is received to access data from the backup, in some instances, a pointer may point back to the data on the original location. However, this backup still functions as if all of the data was copied instantaneously. These pointers are used for several reasons, including the data being pointed to currently being used, updates being performed on the data which would have to be halted, because the physical copying generally takes a long time to perform, etc. Then, as the resources are available, in some instances, a physical copy may be performed for all of the data, but in some embodiments this is not desirable for at least the reasons set forth above.

The systems, methods and/or computer program products within the scope of the present disclosures may operate in a substantially similar fashion as described above with reference to FIGS. 1-2B and 4 when employing PITC principles. For example, in one embodiment a request to establish a PPRC relationship between a primary storage system (e.g. storage system 202 as shown in FIG. 2A) and a secondary storage system (e.g. storage system 222 as shown in FIG. 2A) may be received, and a path set between the primary storage system and the secondary storage system in response to receiving the request.

Using the path, the copy services management software may automatically establish a PITC service relationship with a background copy between the primary storage system and the secondary storage system. As part of this step, the primary storage system may also establish a change recording bitmap, i.e. an out-of-sync (OOS) bitmap, in order to keep track of any changes to the primary storage system, primary storage device in the primary storage system, etc. that occurred after the point-in-time relationship was established.

When the background copy completes to, data on the primary storage system, device, etc. is flashed to the secondary storage system. Data may be flashed incrementally, in some approaches. Preferably, the data flashed to the secondary storage system includes only data tracks having stored therein one or more valid data records, such as may be determined from the out-of-sync (OOS) bitmap, as would be understood by one of skill in the art upon reading the present descriptions. This helps to minimize the duration and overhead required for establishing the PITC service relationship and/or the PPRC relationship, as well as migrating data from the primary storage system to the secondary storage system, in various approaches.

Of course, any of the embodiments and/or approaches described herein may be implemented in either the system or computer program product, as described above, according to a plurality of additional embodiments.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A primary storage system, comprising:
   at least one primary storage device;
   at least one controller;
   an interface for a hardwire connection that is adapted to communicate data between the primary storage system and a secondary storage system; and
   logic integrated with and/or executable by the at least one controller, the logic being configured to:
      receive a request to establish a Peer-to-Peer Remote Copy (PPRC) relationship between the primary storage system and the secondary storage system;
      set a path between the primary storage system and the secondary storage system via the hardwire connection in response to receiving the request;
      receive a memory map;
      establish the PPRC relationship between the primary storage system and the secondary storage system in response to receiving the memory map; and
      copy, based at least in part on the memory map, one or more data tracks of the primary storage device to the secondary storage system without copying at least one other data track of the primary storage device to the secondary storage system; and
   wherein the one or more data tracks of the primary storage device comprise data tracks of a first characteristic, and
   wherein each other portion of the primary storage device comprises one or more data tracks of a second characteristic,
   wherein the data tracks of the first characteristic comprise valid data records, and
   wherein the data tracks of the second characteristic comprise empty data tracks.

2. The system as recited in claim 1, wherein the one or more valid data records comprise data records having at least one valid pointer associated therewith.

3. The system as recited in claim 1, wherein the data tracks of the second characteristic further comprise invalid data records.

4. The system as recited in claim 3, wherein the one or more invalid data records are selected from a group consisting of: data records having no valid pointer associated therewith; and corrupted data records.

5. The system as recited in claim 1, wherein an amount of time required to copy the one or more data tracks of the primary storage device is directly proportional to a number of data tracks of the first characteristic.

6. The system as recited in claim 1, wherein the one or more data tracks are copied based at least in part on a memory map, wherein the memory map is a bit map, and wherein the bit map is generated based at least in part on a track bit map.

7. The system as recited in claim 1, wherein the one or more data tracks are copied based at least in part on a memory map, wherein the memory map is an out-of-sync (OOS) bitmap.

8. A computer program product for selective copying of track data through peer-to-peer remote copy (PPRC), the computer program product comprising: a non-transitory computer readable storage medium having program code embodied therewith, the program code readable/executable by a primary storage system comprising at least one primary storage device, at least one controller, at least one processor, an interface for a hardwire connection that is adapted to communicate data between the primary storage system and a secondary storage system, and logic integrated with and/or executable by the at least one controller and the at least one processor, to cause the primary storage system to:
   process, by the processor, a received request in response to receiving the request;
   set, by the controller, a path between the primary storage system and the secondary storage system via the hardwire connection in response to receiving the request;
   receive, at the processor, a memory map;
   establish, by the controller, a PPRC relationship between the primary storage system and the secondary storage system in response to receiving the memory map; and
   copy, by the controller, one or more data tracks of a primary storage device of the primary storage system to a secondary storage system without copying at least one other data track of the primary storage device to the secondary storage system,
   wherein the one or more data tracks of the primary storage device comprise data tracks of a first characteristic, and
   wherein other portions of the primary storage device comprise one or more other data tracks of a second characteristic;
   wherein the data tracks of the first characteristic comprise valid data records; and
   wherein the data tracks of the second characteristic comprise empty data tracks.

9. The computer program product as recited in claim 8, wherein the one or more valid data records comprise data records having at least one valid pointer associated therewith.

10. The computer program product as recited in claim 8, wherein the data tracks of the second characteristic further comprise invalid data records.

11. The computer program product as recited in claim 10, wherein the one or more invalid data records further comprise one or more data records selected from a group consisting of: data records having no valid pointer associated therewith; and corrupted data records.

12. The computer program product as recited in claim 8, wherein the program code is further readable/executable by the processor, and in response to processing the memory map, to designate only the one or more data tracks of the primary storage device for copying.

13. The computer program product as recited in claim 8, wherein the program code is further readable/executable by the processor to generate the memory map using software.

14. The computer program product as recited in claim 8, wherein the one or more data tracks are copied based on the memory map,
   wherein the memory map is a bit map based at least in part on a track bit map.

15. A computer-implemented method for selective copying of track data through peer-to-peer remote copy, comprising:
   receiving, at a primary storage system comprising: at least one primary storage device; at least one controller; an interface for a hardwire connection that is adapted to communicate data between the primary storage system and a secondary storage system, and logic integrated with and/or executable by the at least one controller, a request to establish a Peer-to-Peer Remote Copy (PPRC) relationship between the primary storage system and the secondary storage system;
   setting a path between the primary storage system and the secondary storage system via the hardwire connection in response to receiving the request;

receiving a memory map;

establishing the PPRC relationship between the primary storage system and the secondary storage system in response to receiving the memory map; and copying one or more data tracks of the at least one primary storage device in the primary storage system to the secondary storage system without copying at least one other data track of the at least one primary storage device to the secondary storage system, wherein the one or more data tracks of the primary storage device comprise data tracks of a first characteristic, and wherein other portions of the primary storage device comprise one or more other data tracks of a second characteristic;

wherein the data tracks of the first characteristic comprise valid data records; and wherein the data tracks of the second characteristic comprise empty data tracks.

16. The method as recited in claim 15, wherein the one or more valid data records comprise data records having at least one valid pointer associated therewith.

17. The method as recited in claim 15, wherein the data tracks of the second characteristic further comprise invalid data records invalid data records.

18. The method as recited in claim 17, wherein the one or more invalid data records further comprise one or more data records selected from a group consisting of: data records having no valid pointer associated therewith; and corrupted data records.

* * * * *